(12) United States Patent
Li et al.

(10) Patent No.: US 12,556,218 B2
(45) Date of Patent: Feb. 17, 2026

(54) SYSTEMS AND METHODS FOR REDUCING INTERFERENCE BETWEEN TRANSMITTED AND RECEIVED SIGNALS

(71) Applicant: Apple Inc., Cupertino, CA (US)

(72) Inventors: Ding Li, Fremont, CA (US); Vijay Kumar Ramamurthi, Fremont, CA (US); Yaranama Venkata Ramana Dass, Belmont, CA (US); Paul V Flynn, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 605 days.

(21) Appl. No.: 17/963,835

(22) Filed: Oct. 11, 2022

(65) Prior Publication Data

US 2023/0246667 A1  Aug. 3, 2023

Related U.S. Application Data

(60) Provisional application No. 63/306,402, filed on Feb. 3, 2022.

(51) Int. Cl.
*H04B 1/401* (2015.01)
*H04B 1/50* (2006.01)

(52) U.S. Cl.
CPC ............. *H04B 1/401* (2013.01); *H04B 1/50* (2013.01)

(58) Field of Classification Search
CPC ..................................................... H04B 1/401
See application file for complete search history.

(56) References Cited

U.S. PATENT DOCUMENTS

| 10,164,679 | B1 | 12/2018 | Rajagopalan et al. |
| 2004/0048577 | A1 | 3/2004 | Godfrey et al. |
| 2008/0221776 | A1* | 9/2008 | McClellan .......... B60R 16/0236 701/115 |
| 2013/0225107 | A1 | 8/2013 | Lane et al. |
| 2015/0072629 | A1* | 3/2015 | Rofougaran ......... H04B 7/0404 455/73 |

FOREIGN PATENT DOCUMENTS

| WO | 2012064093 A2 | 5/2012 |
| WO | 2013184971 A1 | 12/2013 |

OTHER PUBLICATIONS

International Search Report & Written Opinion for PCT Application No. PCT/US2023/011533 dated Jul. 10, 2023; 17 pgs.

* cited by examiner

Primary Examiner — Hsinchun Liao
(74) Attorney, Agent, or Firm — FLETCHER YODER PC

(57) ABSTRACT

An electronic device that includes several antennas, at least one of which can receive signals communicated using a first type of wireless communication and at least another of which can transmit signals using a second type of wireless communication. The electronic device enables a signal to be transmitted in an unrestricted or restricted manner based on a criticality of data to be included in the signal.

20 Claims, 5 Drawing Sheets

SYSTEMS AND METHODS FOR REDUCING INTERFERENCE BETWEEN TRANSMITTED AND RECEIVED SIGNALS

CROSS-REFERENCE TO RELATED APPLICATIONS

This application claims priority to U.S. Application No. 63/306,402, entitled "SYSTEMS AND METHODS FOR REDUCING INTERFERENCE BETWEEN TRANSMITTED NAD RECEIVED SIGNALS," filed Feb. 3, 2022, which is hereby incorporated by reference in its entirety for all purposes.

BACKGROUND

The present disclosure relates generally to wireless communication, and more specifically to interference caused by transmitting a signal while receiving another signal.

In an electronic device, a transmitter and a receiver may each be coupled to a respective set of antennas to enable the electronic device to both transmit and receive wireless signals. However, interference between the transmitted and received signals may occur, for example, when the device transmits a signal while also receiving another signal. For instance, in some cases the signal transmitted by the electronic device and the signal received by the electronic device may have similar or overlapping frequencies, thereby causing interference which may lead to the received signal becoming corrupted. In other words, because interference may alter the received signal, the electronic device may not receive the correct data (indicated by the original, unaltered signal as sent by another device).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device includes a first set of antennas, a second set of antennas, a receiver configured to receive a receive signal using the first set of antennas over a first frequency range, and a transmitter configured to send a transmit signal using the second set of antennas over a second frequency range that at least partially overlaps the first frequency range. The electronic device also includes one or more processors configured to receive an indication of a criticality of data to be sent by the transmitter. The one or more processors are also configured to cause the transmitter to transmit the data over the second frequency range or over a third frequency range that is smaller than, and included within, the second frequency range, based on the criticality of the data.

In another embodiment, a non-transitory computer-readable medium includes instructions that, when executed by one or more processors or an electronic device, cause the one or more processors to cause the electronic device to operate either in a first mode of operation or a second mode of operation. In the first mode of operation, a first antenna and a second antenna of the electronic device are configured to receive a first signal using a first type of wireless communication over a first frequency range. In the second mode of operation, the second antenna and a third antenna of the electronic device are configured to receive the first signal using the first type of wireless communication over the first frequency range. The instructions, when executed and when the electronic device is operating in the second mode of operation, cause the one or more processor to cause, based on a criticality of data to be included in a second signal, transmission of the second signal over a second frequency range that at least partially overlaps the first frequency range or transmission of the second signal over a third frequency range that is smaller than, and included within, the second frequency range.

In yet another embodiment, a method includes causing, via one or more processors of an electronic device, the electronic device to operate either in a first mode of operation or a second mode of operation. In the first mode of operation, a first antenna and a second antenna of the electronic device are configured to receive a first signal sent using a first type of wireless communication. In the second mode of operation, the second antenna and a third antenna of the electronic device are configured to receive the first signal. When the electronic device is operating in the first mode of operation and not receiving the first signal, the method also includes causing, via the one or more processors and based on a criticality of data to be included in a second signal, unrestricted transmission or restricted transmission of the second signal. When the electronic device is operating in the first mode of operation and receiving the first signal, the method also includes causing, via the one or more processors and based on the criticality of the data to be included in the second signal, unrestricted transmission of the second signal or transmission of the second signal to be prevented. Additionally, when the electronic device is operating in the second mode of operation, the method includes causing, via the one or more processors and based on the criticality of the data to be included in the second signal, unrestricted transmission or restricted transmission of the second signal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
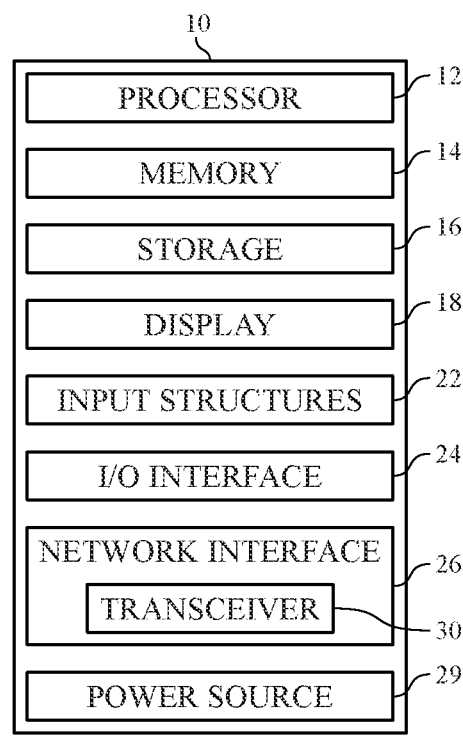
FIG. 1 is a block diagram of an electronic device, according to embodiments of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Furthermore, a "set" may include one or more of the items or components of the set. For instance, a set of "X" could include a single "X" or more than one "X."

This disclosure is directed to reducing or eliminating interference that may occur when a device concurrently transmits and receives signals. For example, an electronic device may include multiple antennas used for transmitting and receiving signals in accordance with different communication methods (e.g., different types of wireless communication). Signals for a particular type of communication may generally have a particular frequency or range of frequencies and be transmitted and/or received on a respective set of antennas. In some cases, the frequencies or frequency ranges for multiple types of communication may overlap. When the electronic device transmits a signal that has a frequency (or frequency range) or harmonic that is similar or the same as a signal that the electronic device is concurrently receiving, interference may occur, which may cause the signal (and underlying data conveyed in the signal) to be corrupted.

Embodiments herein provide various apparatuses and techniques to concurrently transmit and receive signals with similar or overlapping frequencies (or harmonics with similar or overlapping frequencies) while reducing or eliminating the occurrence of interference. In other words, the embodiments described herein enable wireless coexistence of transmitted and received signals that share overlapping frequency ranges (e.g., between Bluetooth®/Bluetooth Low Energy (BLE) signals and satellite signals operating on the Institute of Electrical and Electronics Engineers IEEE S-band) while reducing or eliminating the occurrence of interference between the signals. To do so, the embodiments disclosed herein include techniques in which the transmissions are enabled to occur (e.g., in an unrestricted manner or a restricted manner) or prevented based on a criticality (e.g., priority or importance) of data to be transmitted and whether interference is likely to occur with received signals. More specifically, as described below, the manner in which signals are transmitted as well as the prevention of transmitting signals may be determined based at least on which antennas are set to transmit and receive data (e.g., using respective types of wireless communication). For example, when there is data to be transmitted (e.g., in a signal) using a different type of wireless communication, a signal may be transmitted in an unrestricted manner (e.g., over a first frequency range that may at least partially overlap with a second frequency range over which signals may be received) or a restricted manner (e.g., over a third frequency range that may be included in, and smaller than the first frequency range (and not overlap with the second frequency range)) based on a criticality of the data when interference is unlikely (e.g., based on which antennas are set to receive data). Additionally, when interference is likely, based on a criticality of the data, the signal may be: 1) transmitted an unrestricted or restricted manner; or 2) transmitted in an unrestricted manner or prevented from being sent (e.g., when a signal is also being received). When transmitting data in a restricted manner, the frequency range utilized may be smaller than the frequency range used when transmitting in an unrestricted manner.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an 110 port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a Bluetooth® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), 4th generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
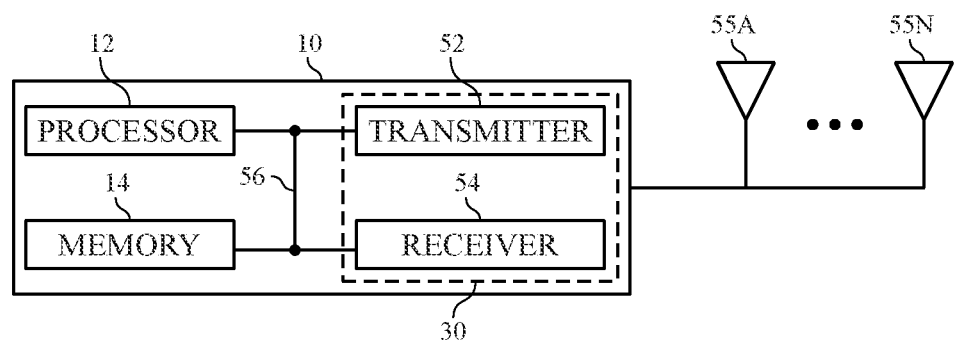
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
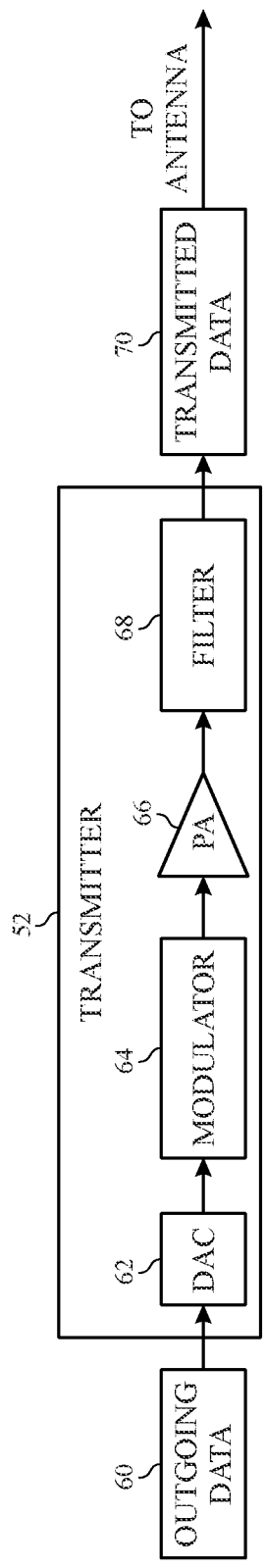
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
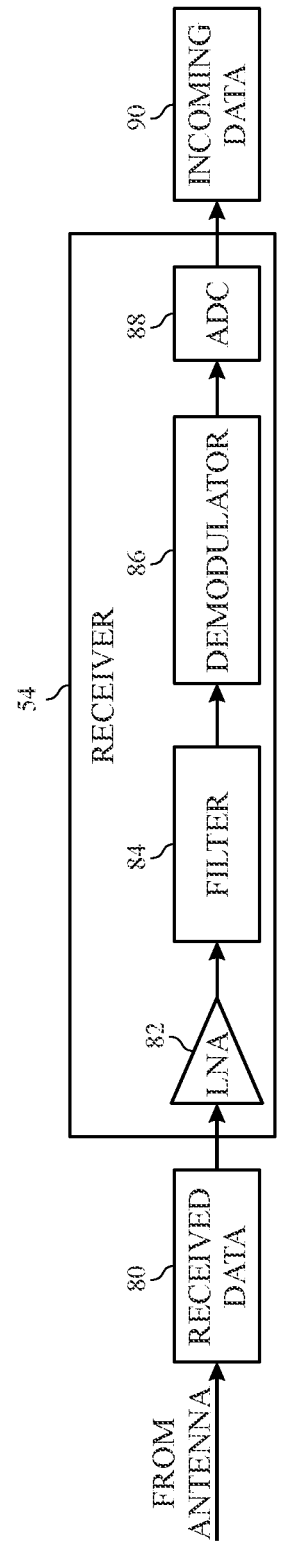
FIG. 4 is a schematic diagram of a receiver of the electronic device of FIG. 1, according to embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figure 5:
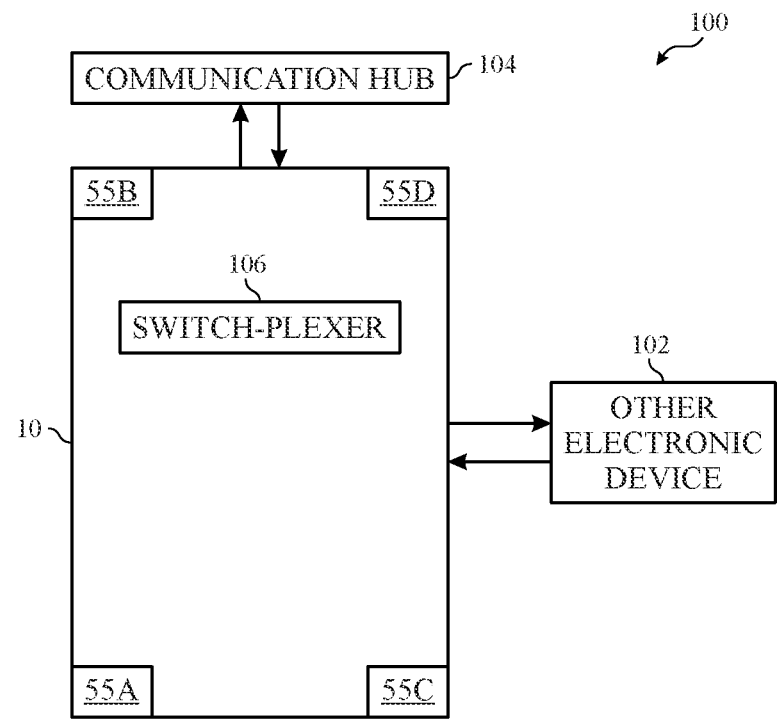
FIG. 5 is a block diagram of a communication system that includes the electronic device of FIG. 1, according to embodiments of the present disclosure.

As described above, the present disclosure generally relates to concurrently transmitting and receiving signals in a manner that reduces or eliminates the occurrence of interference between the signals. That is, the techniques described herein enable wireless coexistence of transmitted and received signals that share overlapping frequency ranges while reducing or eliminating the occurrence of interference between the signals. To help provide more context, FIG. 5 is provided. In particular, FIG. 5 is a block diagram of a communication system 100 that includes the electronic device 10, another electronic device 102, and a communication hub 104. As illustrated, the electronic device 10 may be communicatively coupled to both the other electronic device 102 and the communication hub 104. More specifically, the other electronic device 102 may include any electronic device that may wirelessly communicatively couple to the electronic device 10 through the network interface 26 (shown in FIG. 1) via any suitable communication network, such as a peer-to-peer (P2P) or device-to-device (D2D), a PAN, a UWB or Bluetooth® network, a LAN or WLAN, a network employing one of the IEEE 802.11x family of protocols (e.g., WI-FI®), and/or a WAN via, for example, any standards related to the 3GPP (e.g., a 3G cellular network, UMTS, 4G cellular network, LTE® cellular network, LTE-LAA cellular network, 5G cellular network, and/or NR cellular network, a satellite network, and/or a non-terrestrial network). As more specific, yet still non-limiting, examples, the other electronic device 102 may include a second electronic device 10 or an electronic device that may wirelessly communicate with the electronic device 10, such as a wireless input device (e.g., a mouse or keyboard), audio device (e.g., headphones, earphones, speakers), printer, alarm, appliance (e.g., a smart appliance), medical device (e.g., heart monitor, pacemaker, glucose monitor), fitness tracker, or display device (e.g., television, display, monitor), for example, via a PAN (e.g., a Bluetooth® network). It should be understood that the other electronic device 102 may also include circuitry that enables the other electronic device 102 to wirelessly communicate with the electronic device 10. In other words, the other electronic device 102 may include one or more transceivers, transmitters, receivers, antennas, as well as processing circuitry.

The communication hub 104 may include an electronic device or a system that itself includes multiple electronic devices, and the communication hub 104 may communicate with the electronic device 10 using a WAN via, for example, any standards related to the 3GPP (e.g., a 3G cellular network, UMTS, 4G cellular network, LTE® cellular network, LTE-LAA cellular network, 5G cellular network, and/or NR cellular network, a satellite network, and/or a non-terrestrial network). Accordingly, the communication hub 104 may include circuitry that enables the communication hub 104 to communicate with the electronic device 10 (e.g., one or more transceivers, transmitters, receivers, antenna, as well as processing circuitry). Examples of the communication hub 104 may include a base station (e.g., a gNodeB base station (a base station implemented in the context of LTE), an eNodeB base station (a base station implemented in the context of 5G NR), a high altitude platform stations (HAPS), a satellite, a ground station, and so on).

As noted above, the electronic device 10 may include antennas (e.g. antennas 55A-55N of FIG. 1) that are used to receive and transmit signals from other devices. In the illustrated embodiment of the electronic device 10, the electronic device 10 includes four antennas: a first antenna 55A (located in a bottom-left corner of the electronic device 10 when oriented in a "portrait" orientation such that the electronic device 10 has a height greater than its width), a second antenna 55B (located in a top-left corner of the electronic device 10 when oriented in the portrait orientation), a third antenna 55C (located in a bottom-right corner of the electronic device 10 when oriented in the portrait orientation), and a fourth antenna 55D (located in a top-right corner of the electronic device 10 when oriented in the portrait orientation). The antennas 55A-55D enable the electronic device 10 to communicatively couple to the other electronic device 102 and the communication hub 104 using multiple types of wireless communication techniques (e.g., in accordance with multiple wireless standards or using multiple types of wireless networks). For instance, in one embodiment, the first antenna 55A and second antenna 55B may be utilized for communicating with the communication hub 104. In other words, the first antenna 55A and second antenna 55B may enable the electronic device to transmit and receive signals in accordance with a first type of communication standard or network (e.g., a WAN network, a satellite network, a non-terrestrial network, or a combination thereof). The third antenna 55C may be utilized for communication in accordance with a second type of communication (e.g., using a different type of wireless network or wireless communication method than the first type of communication associated with the first antenna 55A and the second antenna 55B). Accordingly, the third antenna 55C may be utilized for communication with the other electronic device 102. The fourth antenna 55D may be capable of communicating with the communication hub and the other electronic device 102. For example, the fourth antenna 55D may be controlled by the processor 12 or a switch-plexer 106 to switchably operate in accordance with the first type of communication or the second type of communication. In other words, the fourth antenna 55D is a shared antenna that can operate to transmit or receive signals using the same type of communication as the first antenna 55A and the second antenna 55B, or the same type of communication as the third antenna 55C (e.g., based on how the fourth antenna 55D is controlled by the processor 12 or switch-plexer 106). In other embodiments, the electronic device 10 may include fewer or more than four antennas, and different numbers of the antennas may support various types of communication. For example, there may be more than one antenna capable of supporting multiple types of communication that the switch-plexer 106 can control. Moreover, the electronic device 10 may include multiple switch-plexers 106 that can control an antenna 55 (or several antennas 55) as described herein with respect to the switch-plexer 106. Furthermore, it should be noted that the techniques described below are not limited to the embodiment of the electronic device 10 described with respect to FIG. 5. That is, the techniques described herein may be utilized with any electronic device that includes multiple antennas that enable the electronic device 10 to communicate in accordance with more than one wireless standard and/or type of wireless network.

Figure 6:
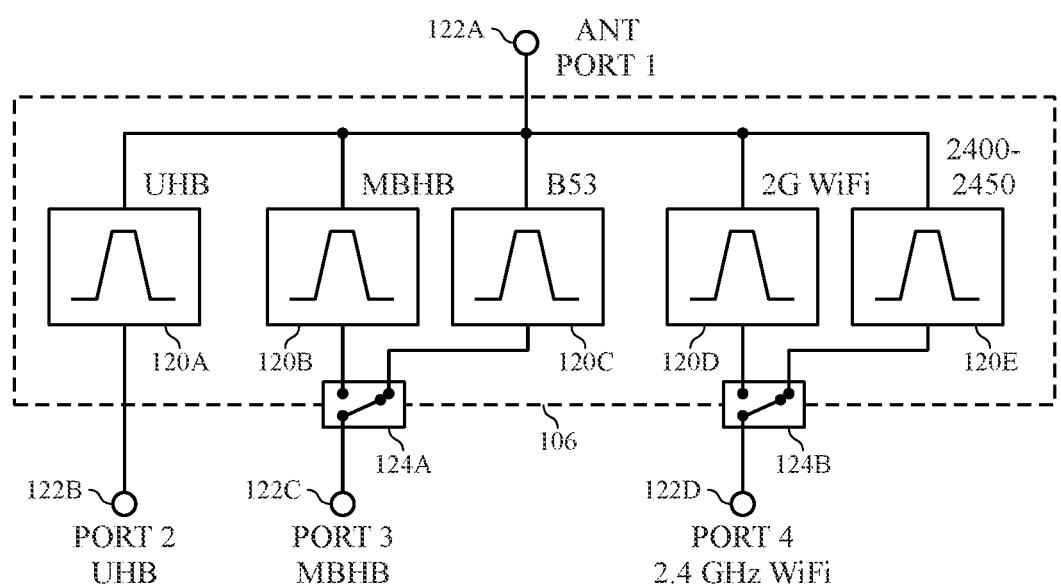
FIG. 6 is a schematic diagram of the switch-plexer of FIG. 5, according to embodiments of the present disclosure.

Before continuing to describe those techniques, the switch-plexer 106 will be discussed. In particular, FIG. 6 is a schematic diagram of the switch-plexer 106. As noted above with regards to the communication system 100 illustrated in FIG. 5, the switch-plexer 106 is communicatively coupled to the fourth antenna 55D and the processor 12, and may control the fourth antenna 55D based on, for example, signals received from the processor 12. Additionally, in some embodiments, the switch-plexer 106 may be communicatively coupled to, and able to control, other antenna(s) included of the electronic device 10.

The switch-plexer 106 may include several filters 120 (collectively referring to filters 120A, 120B, 120C, 120D, 120E): an ultra-high band (UHB) filter 120A, a medium-band high-band (MBHB) filter 120B, band-pass filter 120C, a $2^{rd}$ generation (2G) cellular network and WI-FI® filter 120D, and a frequency filter 120E. The switch-plexer 106 may also include ports 122 (collectively referring to ports 122A, 122B, 122C, 122D): antenna port 122A, ultra-high band port 122B, medium-band high-band port 122C, and a fourth port 122D (for 2G and WI-FI® communication). Ports 122B, 122C, 122D may be communicatively coupled to circuitry that generates signals to be transmitted (e.g., the transceiver 30 or transmitter 52). The antenna port 122A may be communicatively coupled to the fourth antenna 55D. The filters 120 operate to limit the range of frequencies that pass through the filters 120 as the signals are routed between the antenna port 122A and the ports 122B, 122C, 122D. For example, the UHB filter 120A may allow ultra-high frequencies (e.g., 24 gigahertz (GHz) to 3 GHz) or more that may be used for 5G communication) to pass through the filter 120A and filter out frequencies that are not ultra-high frequencies. The MBHB filter 120B may allow medium-band and high-band frequencies (e.g., 3 MHz to 40 GHz) to pass through the MBHB filter 120B and filter out frequencies that are not medium-band or high-band frequencies. The band-pass filter 120C may allow certain frequencies associated with LTE Band 53 (e.g., 2483.5 MHz to 2495 MHz) to pass through the filter 120C and filter out other frequencies. The 2G cellular network and WI-FED filter 120D may allow frequencies associated with 2G and WI-FI® communication (e.g., the 800 MHz frequency band, the 1900 MHz frequency band, the 2.4 GHz frequency band, the 5 GHz frequency band, and so on) to pass through the filter 120D and filter out other frequencies. Furthermore, the frequency filter 120E may allow particular range of frequencies (e.g., 2400 MHz to 2450 MHz) to pass through the filter 120E while filtering out other frequencies. Accordingly, the filters 120 may receive signals (e.g., from the antenna port 122A or one of the ports 122B, 122C, 122D) and filter the signals as the signals are received (e.g., from other devices via the antenna port 122A) or to be transmitted (e.g., signals sent via ports 122B, 122C, 122D to the filters 120 be transmitted to other devices via the antenna 55D).

The switch-plexer 106 also includes switch 124A and switch 124B (referred to collectively as "switches 124"). The switch 124A selectively (e.g., based on signals received from the processor 12) couples the MBHB port 122C to the MBHB filter 120B or the band-pass filter 120C. Additionally, the switch 124B selectively (e.g., based on signals received from the processor 12) couples the fourth port 122D to the 2G and WI-FI® filter 120D or the frequency filter 120E. As discussed below, the frequency filter 120E may be utilized to limit the range of frequencies that is transmitted via an antenna (e.g., fourth antenna 55D) to reduce or eliminate the occurrence of interference occurring when the antenna is transmitting a signal and another antenna is receiving a signal.

However, before returning to discuss FIG. 5, it should be noted that the frequency ranges and types of signals discuss above with respect to the filters 120 may differ in other embodiments. Further, the filters 120 may be utilized to filter other types of signals than those described above. For instance, the 2G and Wi-FI® filter 120D may be utilized with other types of WLAN communication or with PANs such as Bluetooth® networks.

Returning briefly to FIG. 5, the electronic device 10 may transmit and receive signals in accordance with various types of communications. In some cases, the electronic device 10 may transmit a signal (or signals) from one antenna using a first type of communication (e.g., a PAN, WLAN, Bluetooth, or an IEEE 802.11x network) while receiving, at another antenna, a signal (or signals) using a second type of communication (e.g., a satellite or non-terrestrial network). In some instances, the two types of communication may utilize the same or similar (e.g., overlapping or partially overlapping) frequencies or frequency ranges. For example, the electronic device 10 may operate in accordance with several modes of operation in which different sets of the antennas 55 are utilized to receive a first type of signal. More specifically, in a first mode of operation, a first set of antennas 55 that includes the first antenna 55A and second antenna 55B may be utilized to receive the first type of signal (e.g., a satellite or non-terrestrial network signal), while in the second mode of operation, a second set of antennas that includes the second antenna 55B and the fourth antenna 55D may be utilized to receive the first type of signal. The mode of operation may be determined based on an orientation of the electronic device 10 (e.g., in a "portrait" or vertical orientation as shown in FIG. 5 or in "landscape" or horizontal orientation in which the device is rotated clockwise or counterclockwise by 90° relative to the portrait orientation) as determined by the processor 12. In particular, the electronic device 10 may operate using a particular mode of operation because a user may typically be covering up other antennas 55 (e.g., antennas that are not utilized to receive signals), thus hampering the effectiveness of the other antennas 55, when holding the electronic device 10 in a particular orientation. For example, when the electronic device 10 has a landscape orientation, the electronic device 10 may utilize the first mode of operation (e.g., utilizing the first antenna 55A and second antenna 55B to receive the first type of signal), as the user's hands may be at least partially covering the third antenna 55C and the fourth antenna 55D when holding the electronic device 10. When the electronic device 10 has a portrait orientation, the electronic device 10 may utilize the second mode of operation (e.g., utilizing the second antenna 55B and fourth antenna 55D to receive the first type of signal), as the user's hands may be at least partially covering the first antenna 55A and the third antenna 55C when holding the electronic device 10. For either mode of operation, the third antenna 55C may be utilized to transmit data using a second type of signal (e.g., a signal in accordance with a different standard or type of wireless signal than the first signal, such as a PAN, WLAN, Bluetooth®, or an IEEE 802.11x network). Furthermore, in the first mode of operation, the fourth antenna 55D may also be used to transmit data using the second type of signal. However, in some cases (and depending on the mode of operation), signals that may be transmitted by the third antenna 55C, fourth antenna 55D, or both may interfere with a signal or signals being received via the first antenna 55A, second antenna 55B, fourth antenna 55D, or a combination thereof. In some embodiments, sensors (e.g., proximity sensors, light sensors, the antennas 55 in coordination with the transceiver 40, the transmitter 52, or the receiver 54) to determine which, if any, of the antennas 55 are at least partially blocked (e.g., by the user's hands). In such embodiments, the processor 12 may determine the mode of operation based on such a determination (e.g., to cause a mode of operation in which antennas 55 that are not covered to be used) and perform dynamic switching between utilizing the first and second modes of operation. Furthermore, the orientation of the electronic device 10 (e.g., as determined by the processor 12) may be an "indication of interference" such that when the processor 12 determines an orientation of the electronic device 10, the processor 12 may be said to receive an indication of interference because the orientation of the electronic device 10 may be indicative of whether interference may occur. Additionally, while the sets of antennas 55 described above each include two antennas 55, in other embodiments, one or more sets of antennas 55 may include a single antenna 55 or more than two antennas 55.

Figure 7:
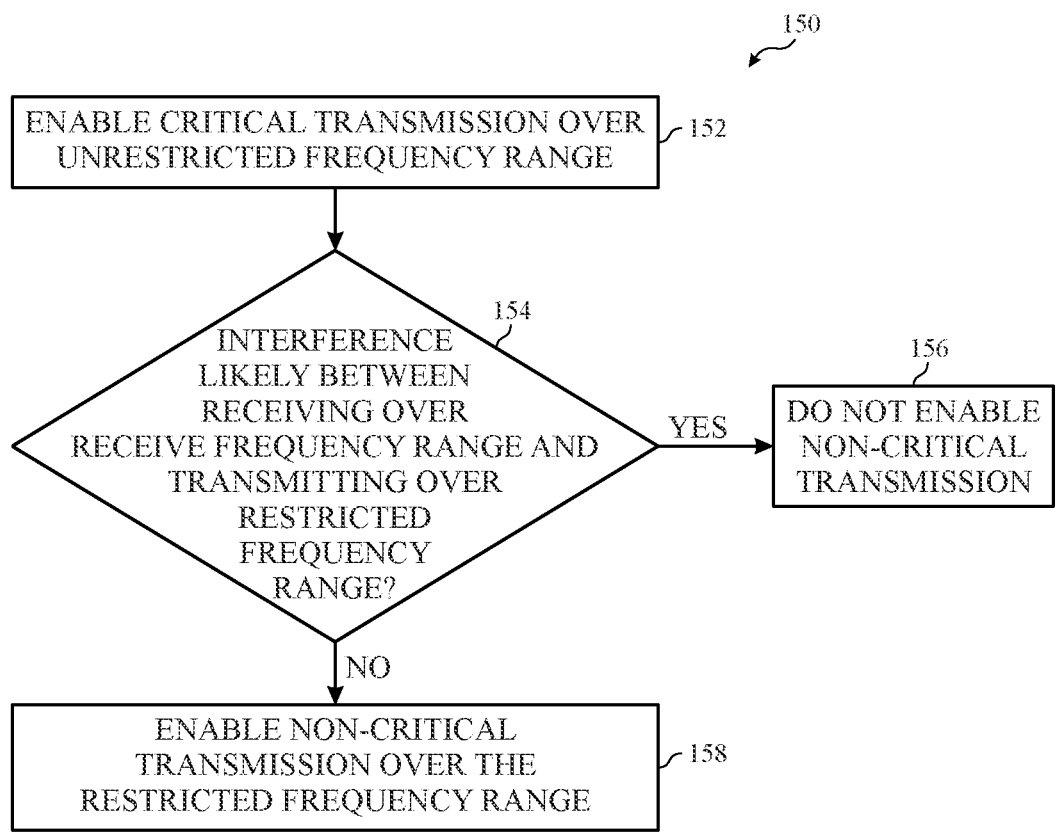
FIG. 7 is a flowchart of a method for transmitting signals with a reduced or eliminated occurrence of interference, according to embodiments of the present disclosure.

As described below, the electronic device 10 may employ a packet classification technique to dynamically select how and if data will be transmitted. More specifically, the electronic device 10 may allow data to be transmitted (by sending a signal using one of the antennas 55) based on whether interference is likely to occur and the criticality (e.g., importance or priority) of the data to be transmitted. By utilizing this technique, the occurrence of interference caused when concurrently transmitting and receiving signals may be reduced or eliminated. With this in mind, FIG. 7 is a flowchart of a method 150 for transmitting signals with a reduced or eliminated occurrence of interference, according to embodiments of the present disclosure. Any suitable device (e.g., a controller) that may control components of the electronic device 10, such as the processor 12, may perform the method 150. In some embodiments, the method 150 may be implemented by executing instructions stored in a tangible, non-transitory, computer-readable medium, such as the memory 14 or storage 16, using the processor 12. For example, the method 150 may be performed at least in part by one or more software components, such as an operating system of the electronic device 10, one or more software applications of the electronic device 10, and the like. While the method 150 is described using steps in a specific sequence, it should be understood that the present disclosure contemplates that the described steps may be performed in different sequences than the sequence illustrated, and certain described steps may be skipped or not performed altogether.

At process block 152, the processor 12 enables transmission of critical data over an unrestricted frequency range. In particular, the data to be included in the signal to be transmitted may be packetized (e.g., include one or more data packets), and the processor 12 may classify the data packets as critical or not critical. In this manner, the processor 12 may receive an indication of data to be transmitted. If the processor 12 determines that data is critical, the processor 12 enables transmission of the critical data over an unrestricted frequency range. For example, in one embodiment, the unrestricted frequency range may be the 2.4 GHz industrial, scientific and medical (ISM) band that may be utilized for signals sent within a PAN (e.g., a Bluetooth® network). Because the data may be send without limiting the frequency range (e.g., within a channel) of the signal in which the data will be transmitted, the data (and the signal that includes the data) may be said to be transmitted in an unrestricted manner. The processor 12 may cause the data to be transmitted in an unrestricted manner via an antenna 55 not set to receive data (e.g., third antenna 55C). For instance, the processor 12 may cause a signal to be transmitted to be routed through the 2G and WI-FI® filter 120D of the switch-plexer 106 prior to being transmitted. In the example provided above in which the transmitted signal utilizes the 2.4 GHz ISM band, the transmitted signal may utilize the full spectrum of frequencies included in the 2.4 GHz ISM band when the signal is transmitted in an unrestricted manner. As another example, a signal transmitted in an unrestricted manner may be transmitted by an antenna 55 (e.g., third antenna 55C) that may not be communicatively coupled to the switch-plexer 106 (and therefore unable to receive signals that have reduced frequency ranges).

To determine whether data is critical or not critical, the processor 12 may take into account the type of communication being used to transmit the signal to be sent, the type of data included in the packet(s) (e.g., the purpose of the packet(s)), or both. In some embodiments, connection procedure packets may be critical, whereas inquiry procedure packets may not be. For example, for Bluetooth® (also known as Bluetooth Classic) communication, the processor 12 may determine that initial poll and reply to poll packets utilized as part of the connection procedure (e.g., to pair devices to one another) are critical, while packets associated with an inquiry procedure (e.g., inquiries, inquiry responses, paging packets, and paging replies) to discover new devices and other data packets (e.g., data packets that include data to be sent from one device to another) are non-critical. In other words, the processor 12 may determine some packets to have a first, higher level of criticality (or importance or priority), while other packets may have a second, lower level of criticality (e.g., non-critical). In additional or alternative embodiments, device discovery and connection establishment packets may be critical, whereas advertisement packets, pairing and bonding packets, and data packets may not be. For example, for Bluetooth Low Energy (also known as "BLE") communication, the processor 12 may classify scan request and response packets related to device discovery and packets related to connection establishment (e.g., requests to establish a connection or responses to such requests) as critical packets. Conversely, the processor 12 may classify other packets, such as advertisement packets (e.g., sent as part of a device discovery process), packets associated with pairing and bonding (e.g., security keys exchange packets), and data packets as not critical. Thus, the processor 12 may perform Bluetooth® traffic classification and BLE traffic classification to determine a criticality (e.g., criticality level), priority (e.g., priority level), and/or importance (e.g., importance level) of Bluetooth® and BLE packets.

Furthermore, while the two examples of Bluetooth® packet classification and BLE packet classification are given, the processor 12 may determine the criticality of data packets for other types of wireless communication. For example, the processor 12 may generally classify data packets that request (e.g., may result in) a reply from the device to which the data packets will be sent as critical, whereas the processor 12 may classify any other packets (e.g., packets for which no request for a reply is included or it is not known whether a reply will be received) as not critical. As another example, the processor 12 may classify payload data as critical, and connection establishing or maintaining packets as not critical, or vice versa.

At decision block 154, the processor 12 determines whether interference between receiving a signal over a receive frequency range and transmitting a signal over a restricted frequency range is likely to occur (e.g., if the electronic device 10 were to transmit a signal using one antenna 55 while receiving a signal using another antenna 55). For instance, the signal to be transmitted may potentially be one type of wireless communication that has frequency range or harmonic (e.g., a second order harmonic, a third order harmonic, and so on) that overlaps with the signal being received, which may have a second frequency range associated with a second type of wireless communication. As a non-limiting example, the first type of communication (associated with the signal to be transmitted) may be for a WLAN or PAN (e.g., Bluetooth®, near-field communication (NFC), and so on) while the second type of communication may be associated with a satellite or non-terrestrial network. In one embodiment, the processor 12 may determine that interference is likely to occur based on which antennas 55 are being utilized to receive signal (e.g., the mode of operation of the electronic device 10 as discussed above). For example, when two antennas 55 that are positioned relatively close to one another (in comparison to the placement of antennas 55 being used in a different mode of operation) are set to receive, the processor 12 may determine that interference is unlikely. For instance, when operating in the second mode of operation discussed above in which the second antenna 55B and fourth antenna 55D are set to receive, the distance between the antennas 55B, 55D is less than the distance between antennas 55A, 55B that are used when operating in the first mode of operation. Thus, in some instances, the processor 12 may determine whether interference is likely based on the mode operation of the electronic device 10 (e.g., which antennas as are set to receive). That is, the processor 12 may determine that interference is likely when operating in the first mode of operation and that interference unlikely when operating in the second mode of operation. The processor 12 may also take into account the types of communication to be used when determining whether interference is likely. For instance, if the type of wireless communication associated with the received signal does not have an overlapping frequency range (e.g., frequency band) with the type of wireless communication to be used to transmit a signal, the processor 12 may determine that interference is not likely. Furthermore, the processor 12 may determine whether interference is likely to occur based on whether a signal is being received. For example, in one embodiment, the processor 12 may determine that interference is likely when operating in the first mode of operation and when a signal is being received. Conversely, the processor 12 may determine that interference is unlikely when the electronic device 10 is operating in the first mode of operation if a signal is not being received.

If, at decision block 154, the processor 12 determines that interference is likely, at process block 156, the processor 12 may disable non-critical transmission, meaning the processor 12 may prevent signals to be sent for packets determined to not be critical. For example, the processor 12 may cause the data determined not to be critical to be blanked (e.g., erased, overwritten with zeroes) so that there is no data to send.

However, if at decision block at process block 154, the processor 12 determines that interference is not likely, at process block 158, the processor 12 enables transmission of non-critical data over a restricted frequency range. In other words, the processor 12 may cause the data to be transmitted in a restricted manner, meaning the frequency range of the signal to be transmitted may be reduced compared to an unrestricted manner. For instance, the processor 12 may cause the switch-plexer 106 to route the signal through frequency filter 120E to prevent the signal that is ultimately transmitted (e.g., via fourth antenna 55D) from having certain frequencies that may overlap with the frequency range associated with the type of communication of the signal being received. As a more specific example, the signal being received may be a signal having a frequency of 2483.5 MHz to 2500 MHz sent from a satellite being sent, and the signal to be transmitted may be a signal that would typically pass through the 2G and WI-FI® filter 120D (e.g., a signal that may utilize the 2.4 GHz ISM band, such as a signal sent within a PAN (e.g., a Bluetooth® network). However, these frequencies overlap, which could cause interference. By restricting the frequencies that the signal to be transmitted may have, the overlap may be eliminated, thus reducing or eliminating the occurrence of interference. For example, when a signal is transmitted in a restricted manner, the signal may pass through the frequency filter 120E so that the transmitted signal has a frequency between 2400 MHz and 2450 MHz (inclusive). In this manner, the method 150 enables the electronic device 10 to perform dynamic switching between modes of operation to enable wireless coexistence of transmitted and received signals while reducing or eliminating the occurrence of interference that may be caused by transmitting a signal that has a frequency range that overlaps with the frequency range of another signal being received by the electronic device 10. That is, performance of the method 150 enables coexistence of PAN (e.g., Bluetooth® or BLE) signals with other communication or signals, such as IEEE S-band signals (e.g., signals in the frequency range of two to four GHz) associated with satellite communication.

Figure 8:
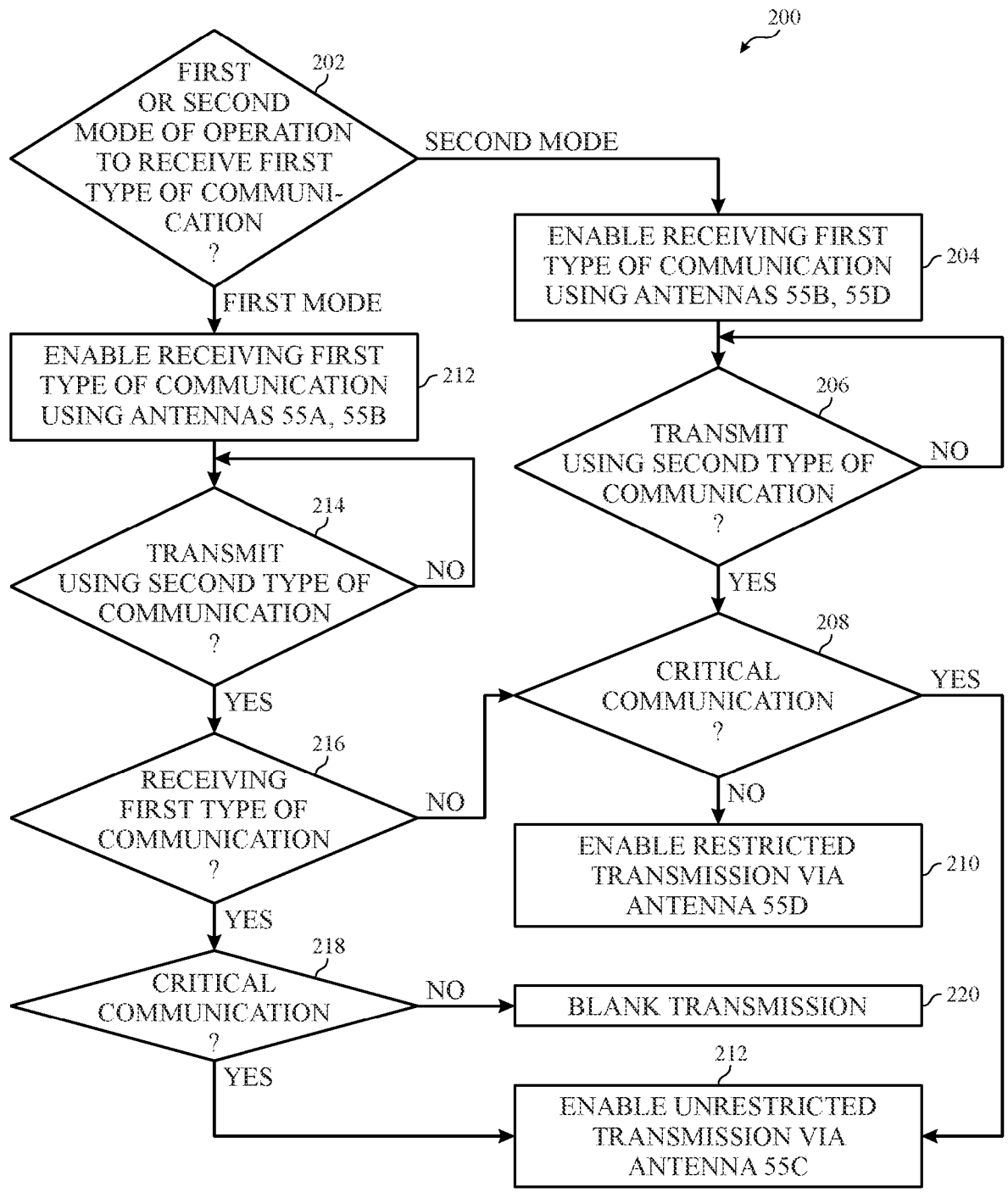
FIG. 8 is a flowchart of a method for controlling the transmission of data to reduce or eliminate the occurrence of interference, according to embodiments of the present disclosure.

Before proceeding to discuss FIG. 8, it should be noted that, in some embodiments, at process block 158, if no signal is being received, the processor 12 may cause a signal to be transmitted over the unrestricted frequency range. In other words, non-critical data may be transmitted as described above with respect to process block 152 if no signal is being received over an antenna 55 (or antennas 55) set to receive data.

Keeping the discussion of FIG. 7 in mind, FIG. 8 is a flowchart of a method 200 for the electronic device 10 to control the transmission of data to reduce or eliminate the occurrence of interference, according to embodiments of the present disclosure. In other words, by performing the method 200, the wireless coexistence of transmitted and received signals that share overlapping frequency ranges while reducing or eliminating the occurrence of interference between the signals may be achieved. Any suitable device (e.g., a controller) that may control components of the electronic device 10, such as the processor 12, may perform the method 200. In some embodiments, the method 200 may be implemented by executing instructions stored in a tangible, non-transitory, computer-readable medium, such as the memory 14 or storage 16, using the processor 12. For example, the method 200 may be performed at least in part by one or more software components, such as an operating system of the electronic device 10, one or more software applications of the electronic device 10, and the like. While the method 200 is described using steps in a specific sequence, it should be understood that the present disclosure contemplates that the described steps may be performed in different sequences than the sequence illustrated, and certain described steps may be skipped or not performed altogether.

At decision block 202, the processor 12 determines whether the first mode of operation or the second mode of operation will be used to receive a first type of communication. For example, as noted above, in the first mode of operation antennas 55A, 55B may be set to receive signals of the first type of communication (e.g., a satellite network or non-terrestrial network. In the second mode of operation antennas 55B, 55D may be set to receive signals of the first type of communication. As also described above, the processor 12 may determine which mode of operation to use based on which antennas are or likely to be blocked, the orientation of the electronic device 10, or both. Generally, the processor 12 may determine the mode of operation that increases or maximizes the use of unblocked antennas 55. For example, when the processor 12 determines the electronic device 10 has a horizontal orientation (e.g., such that it is likely that antennas 55C and/or 55D may be at least partially blocked), the processor 12 may determine that the first mode of operation should be used. Conversely, when the processor 12 determines the electronic device 10 has a vertical orientation (e.g., such that it is likely that antennas 55A and/or 55C may be at least partially blocked), the processor 12 may determine that the second mode of operation should be used. Before continuing to discuss the remainder of the method 200, it should be noted that the portions of the method 200 associated with the second mode of operation will be discussed before returning to discuss the portions of the method 200 specific to the first mode of operation because operations associated with the second mode of operation may also be performed when operating in the first mode of operation.

In response to determining that the second mode of operation is to be used to receive signals of the first type of communication, the processor 12 may cause the antennas 55B, 55D to be set to receive signals of the first type of communication. In other words, the processor 12 may cause the electronic device 10 to receive signals of the first type of communication in accordance with the second mode of operation. The receiver 54 of the electronic device 10 may then receive signals of the first type of communication via the antennas 55B, 55D.

At decision block 206, the processor 12 determines whether data will be transmitted using a second type of communication. The second type of communication (e.g., a PAN, WLAN, Bluetooth®, or an IEEE 802.11x network) may be a form of wireless communication that differs from the first type of communication. More specifically, the second type of communication may be associated with a frequency range that overlaps with a frequency range of the first type of communication. If the processor 12 determines that there is no such data to be transmitted, the processor 12 may continue to wait until there is data to be transmitted. Furthermore, the electronic device 10 may receive (or continue to receive) signals using the first type of communication.

However, if, at decision block 206, the processor 12 determines that there is data to be transmitted using the second type of communication, at decision block 208, the processor 12 determines whether the data to be sent is critical. The processor 12 may determine whether the data to be sent is critical as described above with respect to process block 152 of the method 150. For example, to determine whether data is critical or not critical, the processor 12 may take into account the type of communication being used to transmit the signal to be sent, the type of data included in the packet(s) (e.g., the purpose of the packet(s)), or both. For example, for Bluetooth® (also known as Bluetooth Classic) communication, the processor 12 may determine that initial poll and reply to poll packets utilized as part of the connection procedure (e.g., to pair devices to one another) are critical, while packets associated with an inquiry procedure (e.g., inquiries, inquiry responses, paging packets, and paging replies) to discover new devices and other data packets (e.g., data packets that include data to be sent from one device to another) are non-critical. As another example, for Bluetooth Low Energy (also known as "BLE") communication, the processor 12 may classify scan request and response packets related to device discovery and packets related to connection establishment (e.g., requests to establish a connection or responses to such requests) as critical packets. Conversely, the processor 12 may classify other packets, such as advertisement packets (e.g., sent as part of a device discovery process), packets associated with pairing and bonding (e.g., security keys exchange packets), and data packets as not critical. While these two examples as given, the processor 12 may determine the criticality of data packets for other types of wireless communication. For example, the processor 12 may generally classify data packets that will result in a reply from the device to which the data packets will be sent as critical, whereas the processor 12 may classify any other packets (e.g., packets for which it is not known whether a reply will be received) as not critical. As another example, the processor 12 may classify payload data as critical, and connection establishing or maintaining packets as not critical, or vice versa.

If at decision block 208, the processor 12 determines that the data is not critical, at process block 210, the processor 12 causes the data to be transmitted in a restricted manner, meaning the frequency range of the signal to be transmitted may be reduced compared to an unrestricted manner. For instance, the processor 12 may cause the switch-plexer 106 to route a signal that includes the data through frequency filter 120E to prevent the signal that is ultimately transmitted via fourth antenna 55D from having certain frequencies that may overlap with the frequency range associated with the type of communication of the signal being received. Indeed, in the example discussed above with respect to FIG. 7, a signal that passes through the frequency filter 120E prior to being transmitted via an antenna 55 (e.g., the fourth antenna 55D) may have a frequency of 2400 MHz to 2450 MHz (inclusive), which is a reduced range of frequencies compared to the 2400 MHz to 2483.5 MHz range of that an unrestricted signal may have. Thus, to transmit data that is determined not to be critical (and when the second mode of operation is employed), the processor 12 may temporarily cause the fourth antenna 55D to be used to transmit a signal that includes the data. However, it should be noted that, in some embodiments, at process block 210, the processor 12 may cause a signal to be transmitted in an unrestricted manner (e.g., using antenna 55C). For instance, because no signal is being received, interference may considered unlikely to occur. As such, non-critical data may be transmitted over an unrestricted frequency range if no signal is being received over an antenna 55 (or antennas 55) set to receive data.

Conversely, if at decision block 208 the processor 12 determines that the data is critical, at process block 212, the processor 12 causes the data to be transmitted in an unrestricted manner (e.g., without limiting the frequency range of the signal to be transmitted) via an antenna 55 not set to receive data (e.g., third antenna 55C). In another embodiment, the signal may be sent in an unrestricted manner by routing the signal through the 2G cellular network and WI-FI® filter 120D of the switch-plexer 106 and transmitting the signal using the fourth antenna 55D. Furthermore, in yet another embodiment, the signal may be sent in a restricted manner via the third antenna 55C. In such an embodiment, the third antenna 55C may be communicatively coupled to filter circuitry (e.g., the frequency filter 120E or another filter that performs the same function as the frequency filter 120E) such that a signal may pass through the filter and be transmitted over a smaller frequency range than a signal sent in an unrestricted manner.

Returning to decision block 202, if the processor 12 determines that the first mode of operation should be used to receive the first type of communication, at process block 212, the processor 12 enables signals of the first type of communication to be received using antennas 55A, 55B. In other words, the processor 12 causes the electronic device 10 to operate in accordance with the first mode of operation.

The receiver 54 of the electronic device 10 may then receive signals of the first type of communication via the antennas 55A, 55B.

At decision block 214, the processor 12 determines whether data will be transmitted using the second type of communication. If the processor 12 determines that there is no such data to be transmitted, the processor 12 may continue to wait until there is data to be transmitted. Furthermore, the electronic device 10 may receive (or continue to receive) signals using the first type of communication.

However, if at decision block 214 the processor 12 determines that there is data to be transmitted using the second type of communication, at decision block 216, the processor 12 determines whether the electronic device 10 is receiving a signal using the first type of communication (e.g., via first antenna 55A or second antenna 55B). If the processor 12 determines that the electronic device 10 is not receiving a signal using the first type of communication, the method may proceed to decision block 208, and, as described above, the processor 12 may determine whether the data to be transmitted is critical. As also described above, the processor 12 may perform the operations associated with process block 210 or process block 212 based on whether the data is critical or not critical.

If, at decision block 216, the processor 12 determines that the electronic device 10 is receiving a signal using the first type of communication, at decision block 218, the processor 12 determines whether the data to be transmitted is critical. The processor 12 may determine whether the data to be sent is critical as described above with respect to decision block 208 and process block 152 of the method 150. If the processor 12 determines that the data is critical, the processor 12 may enable unrestricted transmission of the data via the third antenna 55C (as described above with respect to process block 212), and the electronic device 10 may then transmit a signal that includes the data. However, if the processor 12 determines that the data is not critical, at process block 220, the processor 12 may cause the data determined not to be critical to be blanked (e.g., erased, overwritten with zeroes), meaning the data (or a signal that includes the data) will not be sent. In this manner, the method 200 reduces or eliminates the occurrence of interference that may be caused by transmitting a signal that has a frequency range that overlaps with the frequency range of another signal being received by the electronic device 10. That is, because the electronic device 10 may perform dynamic switching between modes of operation, performing the method 200 enables wireless coexistence of transmitted and received signals that share overlapping frequency ranges while reducing or eliminating the occurrence of interference between the signals. For example, performing the method 200 may enable coexistence between S-band signals associated with satellite communication and other signals associated with other types of networks, such as PANs (e.g., a Bluetooth® network).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device comprising:
a first set of antennas;
a second set of antennas;
a receiver configured to receive a receive signal using the first set of antennas over a first frequency range;
a transmitter configured to send a transmit signal using the second set of antennas over a second frequency range that at least partially overlaps the first frequency range; and
one or more processors configured to
receive a criticality indicator indicating a criticality of data to be sent by the transmitter, and
based on the criticality indicator indicating that the data is critical, cause the transmitter to transmit the data over the second frequency range; and
based on the criticality indicator indicating that the data is not critical, cause the transmitter to transmit the data over a third frequency range that is smaller than, and included within, the second frequency range.

2. The electronic device of claim 1, wherein the third frequency range is not overlapping with the first frequency range.

3. The electronic device of claim 2, comprising a frequency filter configured to enable signals of the third frequency range to pass through, wherein the one or more processors are configured to cause the transmitter to transmit a signal comprising the data over the third frequency range by causing the signal to be routed to the second set of antennas via the frequency filter.

4. The electronic device of claim 3, wherein the receiver is configured to receive a second receive signal using the second set of antennas over the first frequency range, and the electronic device comprises a switch-plexer that includes the frequency filter and is configured to cause the second set of antennas to transmit the transmit signal or receive the second receive signal.

5. The electronic device of claim 1, wherein
in a first mode of operation, the first set of antennas comprises a first antenna and a second antenna,
in a second mode of operation, the first set of antennas comprise the second antenna and a third antenna, and
the one or more processors are configured to
receive an indication of a vertical orientation or a horizontal orientation of the electronic device, and
cause the electronic device to operate in the first mode of operation or the second mode of operation based on the indication of the vertical orientation or the horizontal orientation of the electronic device.

6. The electronic device of claim 1, wherein the one or more processors are configured to not transmit the data over the third frequency range based on the data not being critical and the receive signal being received.

7. The electronic device of claim 1, wherein the data is critical when the data comprises connection procedure packets, device discovery packets, connection establishment packets, or any combination thereof.

8. The electronic device of claim 1, wherein the data is not critical when the data comprises inquiry procedure packets, advertisement packets, pairing and bonding packets, data packets, or any combination thereof.

9. The electronic device of claim 1, wherein the one or more processors are configured to cause the transmitter to transmit the data over the second frequency range via a first antenna of the second set of antennas that is not set to receive data.

10. A non-transitory computer-readable medium comprising instructions that, when executed by one or more processors or an electronic device, cause the one or more processors to:
cause the electronic device to operate either in a first mode of operation or a second mode of operation, wherein
in the first mode of operation, a first antenna and a second antenna of the electronic device are configured to receive a first signal using a first type of wireless communication over a first frequency range, and
in the second mode of operation, the second antenna and a third antenna of the electronic device are configured to receive the first signal using the first type of wireless communication over the first frequency range; and
when the electronic device is operating in the second mode of operation and a criticality indicator indicating a criticality of data to be included in a second signal indicates that the data is critical, cause transmission of the second signal over a second frequency range that at least partially overlaps the first frequency range; and
when the electronic device is operating in the first mode of operation and the criticality indicator indicating the criticality of the data to be included in the second signal indicates that the data is not critical, cause transmission of the second signal over a third frequency range that is smaller than, and included within, the second frequency range.

11. The non-transitory computer-readable medium of claim 10, wherein the instructions, when executed, the electronic device is operating in the first mode of operation, and the first signal is not being received, cause the one or more processors to cause, based on the criticality indicator indicating the criticality of the data to be included in the second signal, transmission of the second signal over the second frequency range or transmission of the second signal over the third frequency range.

12. The non-transitory computer-readable medium of claim 11, wherein the instructions, when executed, the electronic device is operating in the first mode of operation, and the first signal is being received, cause the one or more processors to cause, based on the criticality indicator indicating the criticality of the data to be included in the second signal, transmission of the second signal over the second frequency range or transmission of the second signal to be prevented.

13. The non-transitory computer-readable medium of claim 12, wherein the instructions, when executed and the electronic device is operating in the second mode of operation, cause the one or more processors to cause transmission of the second signal over the second frequency range via a fourth antenna of the electronic device, and cause transmission of the second signal over the third frequency range via the third antenna.

14. The non-transitory computer-readable medium of claim 13, wherein the instructions, when executed and the electronic device is operating in the second mode of operation, cause the one or more processors to cause transmission of the second signal over the second frequency range when the criticality indicator indicates that the data is critical and transmission of the second signal over the third frequency range when the criticality indicator indicates that the data is not critical.

15. The non-transitory computer-readable medium of claim 13, wherein the instructions, when executed and the electronic device is operating in the first mode of operation, cause the one or more processors to cause transmission of the second signal over the second frequency range via the fourth antenna.

16. The non-transitory computer-readable medium of claim 10, wherein the instructions, when executed, cause the one or more processors to cause the electronic device to operate in the first mode of operation or the second mode of operation based on an orientation of the electronic device.

17. The non-transitory computer-readable medium of claim 10, wherein the first type of wireless communication comprises communication via a personal area network, the instructions, when executed, cause the one or more processors to cause transmission of the second signal using a second type of wireless communication, and the second type of wireless communication comprises communication with a satellite or via a non-terrestrial network.

18. A method, comprising:

causing, via one or more processors of an electronic device, the electronic device to operate either in a first mode of operation or a second mode of operation, wherein in the first mode of operation, a first antenna and a second antenna of the electronic device are configured to receive a first signal sent using a first type of wireless communication, and in the second mode of operation, the second antenna and a third antenna of the electronic device are configured to receive the first signal;

when the electronic device is operating in the first mode of operation and not receiving the first signal, causing, via the one or more processors and based on a criticality of data to be included in a second signal, unrestricted transmission or restricted transmission of the second signal;

when the electronic device is operating in the first mode of operation and receiving the first signal, causing, via the one or more processors and based on the criticality of the data to be included in the second signal, unrestricted transmission of the second signal or transmission of the second signal to be prevented; and when the electronic device is operating in the second mode of operation, causing, via the one or more processors and based on the criticality of the data to be included in the second signal, unrestricted transmission or restricted transmission of the second signal.

19. The method of claim 18, wherein causing restricted transmission of the second signal comprises causing, via the one or more processors, the second signal to be routed through a frequency filter of the electronic device prior to transmitting the second signal.

20. The method of claim 18, wherein causing transmission of the second signal to be prevented comprises causing, via the one or more processors, the second signal to be blanked.

* * * * *